United States Patent
Hausberg et al.

[11] 3,726,065
[45] Apr. 10, 1973

[54] APPARATUS FOR CLEANING FLUE GASES OF BLAST FURNACES AND THE LIKE

[75] Inventors: Gerhard Hausberg, Essen-Bredeney; Karl-Rudolf Hegemann, Essen-Bergerhausen, both of Germany

[73] Assignee: Gottfried Bischoft Bau Kompl. Gasreinigungsund Wasserruckkuhlanlagen Kommanditgesellschaft, Essen, Germany

[22] Filed: Oct. 12, 1971

[21] Appl. No.: 188,557

[30] Foreign Application Priority Data

Oct. 10, 1970  Germany..................P 20 49 903.0

[52] U.S. Cl. ...............55/223, 55/21, 55/226, 55/238, 55/258, 55/260, 55/344, 55/418, 55/457, 261/1.15, 261/DIG. 54, 266/31
[51] Int. Cl. ..........................................B01d 47/10
[58] Field of Search...................55/21, 223, 226, 55/238, 258, 260, 344, 418, 457, 257; 261/115, DIG. 54; 266/31

[56] References Cited

UNITED STATES PATENTS

| | | | |
|---|---|---|---|
| 2,964,304 | 12/1960 | Rice | 261/118 |
| 3,041,059 | 6/1962 | Powell | 266/31 |
| 3,199,267 | 8/1965 | Hausberg | 55/257 X |
| 3,648,440 | 3/1972 | Egan | 55/226 |
| 3,690,044 | 9/1972 | Boresta | 55/223 |

*Primary Examiner*—Dennis E. Talbert, Jr.
*Attorney*—Karl F. Ross

[57] ABSTRACT

Flue gases from a high-pressure blast furnace are led from above through a dustbin to a wash tower containing several spray heads above a nozzle forming an annular accelerator gap of adjustable width. Adjustment of the gap width is carried out continuously, under the control of pressure sensors upstream and downstream of the gap, to maintain a constant output pressure, except with abnormally low flue-gas pressure in which case an alternate control circuit takes over to maintain a constant pressure differential across the gap. A group of such nozzles, in separate towers or in a common tower, may operate with different and mutually complementary pressure characteristics and may be selectively activated by an upstream pressure sensor whenever the flue-gas pressure fails within the linear range of its characteristic.

10 Claims, 4 Drawing Figures

APPARATUS FOR CLEANING FLUE GASES OF BLAST FURNACES AND THE LIKE

Our present invention relates to an apparatus for scrubbing particle-laden waste gases, such as those of a Bessemer converter, before releasing them into the atmosphere.

In commonly owned U.S. Pat. Nos. 3,140,163 and 3,199,267 (Hausberg), systems for scrubbing or cleaning waste gases have been disclosed wherein the gases are conducted through a wash tower having an upstream compartment with several spray heads, this compartment being separated from a downstream compartment by a transverse partition traversed by one or more nozzles which form throttled passages for the wetted gases. These passages are generally in the form of annular gaps defined by the nozzles and by respective inserts of smaller diameter received therein as disclosed in the later Hausberg patent. Each insert coacts with a constricted waist portion of the associated nozzle whereby an adjustment of the gap width is possible upon relative axial movement of the two bodies. Such adjustment, as likewise taught in that second patent, may be used to maintain a substantially constant pressure differential across the gap.

In flowing through the annular gap, the wetted and particle-laden gases are accelerated so as to develop a certain turbulence resulting in intimate mixing of the two phases. Upon entering the downstream compartment, the gases expand with resulting precipitation of their moisture on the entrained solids which are thereby washed from the gas stream, e.g. with the aid of a baffle-type water separator near the outlet of the tower.

Particularly with waste gases arriving with a high input pressure, such as the flue gases of blast furnaces, it has heretofore been necessary to provide a separate pressure-reducing stage in order to ensure efficient operation of the scrubber together with maintenance of a suitable output pressure as determined by the construction of a water separator through which the purified gases are released into the atmosphere.

An object of our present invention is to provide an improved system for the cleaning of high-pressure flue gases which avoids the need for separate throttle valves or the like downstream of the washing stage.

A more particular object is to provide means in such a system for stabilizing the output pressure at substantially its optimum value in the face of widely varying input pressures, e.g. for the purpose of efficiently operating a water separator in cascade with the wash tower.

In accordance with the present invention, we provide setting means responsive to upstream and downstream pressure sensors for maintaining a substantially constant gas pressure at the tower outlet, in contradistinction to the arrangement of Hausberg U.S. Pat. No. 3,199,267 in which a constant pressure differential is established across the accelerator gaps in the partition.

Such a constant output pressure, however, cannot always be effectively maintained since under certain circumstances, as during the start-up of a blast furnace or other plant generating the waste gases, the input pressure may be so low that the resulting pressure differential between the upstream and downstream compartments is insufficient for efficient moisture precipitation. Thus, according to a further feature of our invention, the apparatus advantageously includes switch means for modifying the operation of the aforedescribed setting means in the presence of an abnormally low input pressure to maintain a substantially constant pressure differential in lieu of a substantially constant output pressure until the input pressure approaches its normal level.

According to another advantageous feature of our invention, we provide a plurality of flow-accelerating nozzles which are disposed in parallel between the inlet and the outlet of the apparatus, these nozzles being accommodated either in separate towers or in a common tower. The pressure characteristics of the nozzles, i.e. the laws of variation of their throttling action in response to changes in input pressure as determined by an associated upstream pressure sensor, has different ranges of substantially linear response to the sensor output, these linear ranges being mutually complementary so as to provide an extended overall range of linearity for the multinozzle system.

Such a set of accelerators may be selectively actuated, again under the control of an upstream pressure sensor, to block all passages except the one which is defined by the nozzle operating at a particular instant along the linear range of this characteristic.

Such a control system, preferably comprising an array of three parallel nozzles centered about the axis of a common tower, may be utilized in conjunction with a water separator disposed alongside this tower in a manner claimed per se in our application Ser. No. 188,558 filed on even date herewith under the title "Apparatus for Scrubbing Waste Gases."

The above and other features of our invention will be described in detail hereinafter with reference to the accompanying drawing in which.

Figure 1:
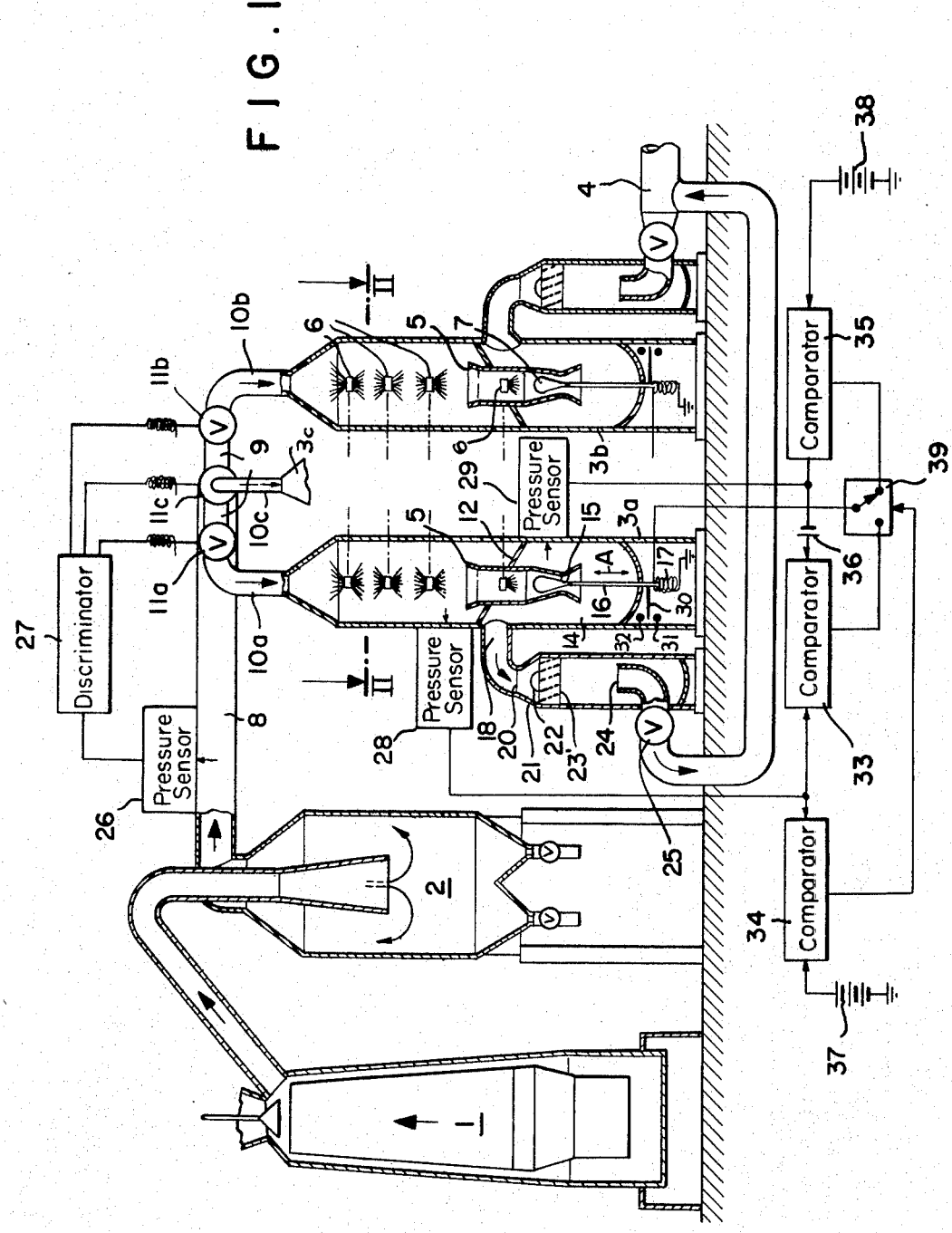
FIG. 1 is a schematic sectional elevation of an apparatus embodying our invention.
Figure 2:
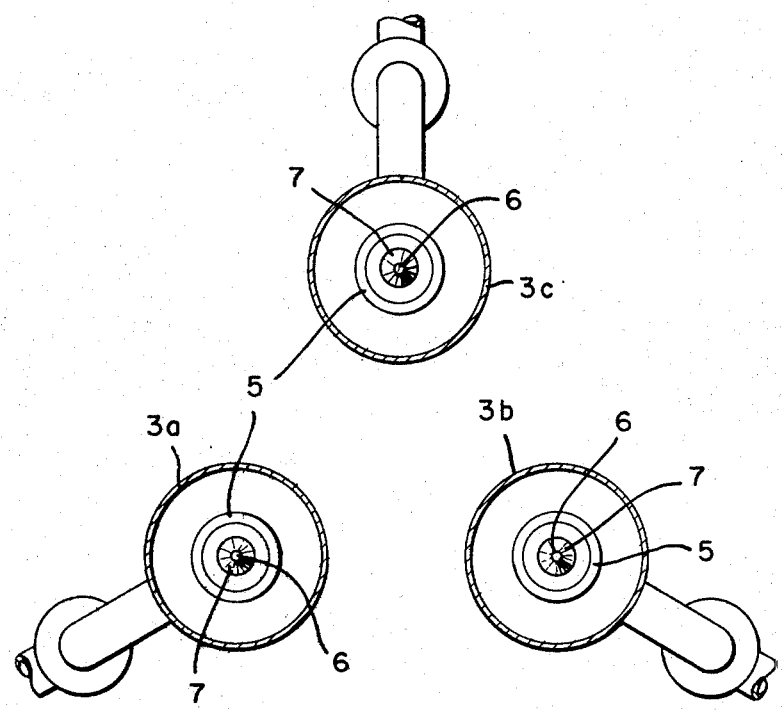
FIG. 2 is a cross-sectional view taken on the line II — II of FIG. 1.

In FIGS. 1 and 2 we have shown a system for the scrubbing of flue gases coming from a high-pressure blast furnace 1, the gases being subjected to coarse cleaning in a dustbin 2 before entering an inlet duct 8 which terminates at an inlet manifold 9 connected by conduits 10a, 10b, 10c to three wash towers 3a, 3b, 3c arranged in a triangular array (see particularly FIG. 2). Conduits 10a, 10b, 10c include respective solenoid valves 11a, 11b, 11c enabling their selective disconnection from the manifold 9. The basic construction of the three wash towers being identical, only tower 3a will be described in detail hereinafter.

A slanting partition 12 divides the interior of the tower into an upstream compartment 13 and a downstream compartment 14; it should be noted that, contrary to the arrangement disclosed in the two above-identified Hausberg patents, the gases to be scrubbed enter the towers at the top and traverse them in a downward direction. Partition 12 carries a nozzle 5 which has a constricted waist portion 5' coacting with an accelerating insert 7 of a downwardly tapering shape to define an annular gap 15 whose width can be varied by vertically shifting the insert 7; for this purpose, the insert is mounted on a stem 16 which is rigid with the core of a controlling solenoid 17. Several spray heads 6, stacked in compartment 13 along the tower axis in line with the nozzle 5, serve to wet the incoming gases on their decent into compartment 14 through the throttled passage 15. This compartment opens into a horizontal outlet duct 18 leading to a water separator 19.

Figure 3:
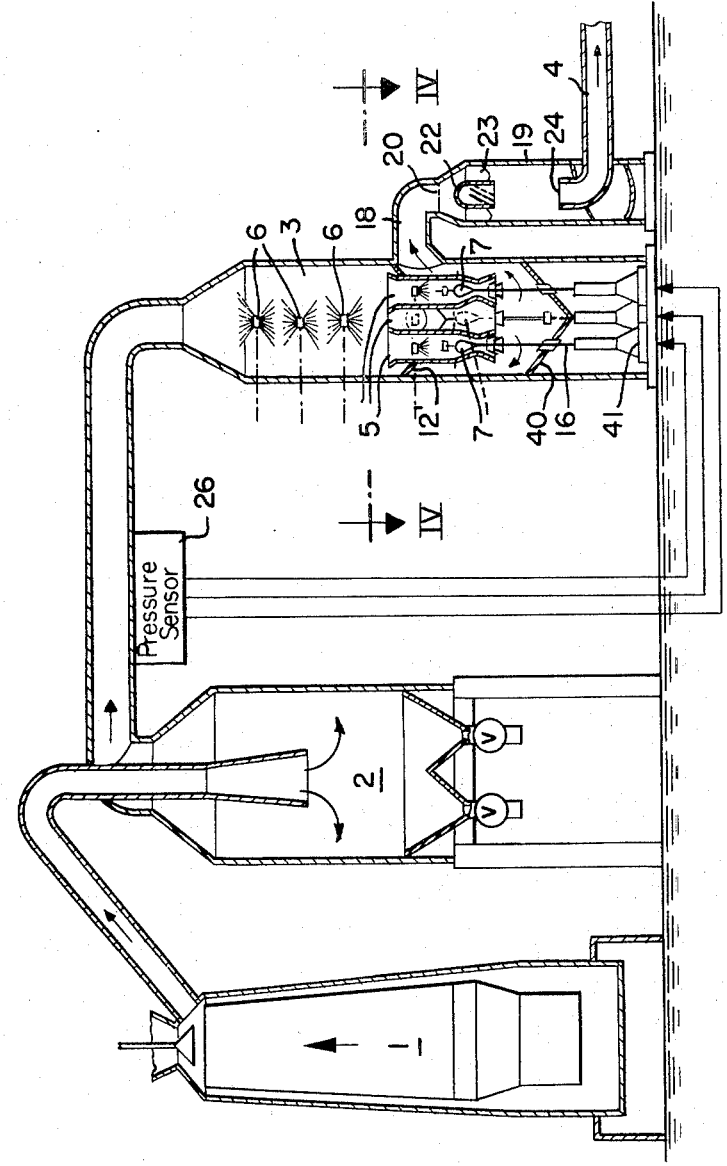
FIG. 3 is a view similar to to FIG. 1, showing a modification.

As more clearly illustrated in FIG. 3, and as described in greater detail in our copending application identified above, separator 19 has a downwardly open entrance port 20 merging into a frustoconical neck 21 which surrounds a generally projectile-shaped deflector 22 centered on the axis thereof, the deflector being held in position by a set of peripheral vanes 23 which are inclined to impart a swirling motion to a gas stream descending through a narrow annular channel defined by the deflector and the cylinder 19. Water entrained by this air stream precipitates on the cylinder wall as the gas expands on leaving the channel, the water then running down to a nonillustrated collector while the gas is discharged through an upwardly open central exit port 24 into an exhaust 4. A further valve 25 in the discharge pipe may be closed together with valve 11a, e.g. manually or electromagnetically, when the tower and its water separator are to be taken out of service.

It will be noted that the outlet 18 is disposed beneath partition 12 above the level of the lower end of nozzle 5, thereby forcing the gases issuing from that nozzle to change direction on their way to the water separator 19. As a result, droplets of water precipitated on entrained solids are removed from the gas stream on account of their greater inertia and continue downwardly into a collection trough not shown, thereby enabling a smaller dimensioning of the separator 19 than would otherwise be necessary.

The input pressure prevailing in duct 8 and manifold 9 is ascertained by a pressure sensor 26 generating an output signal proportional to that pressure, this signal being delivered to a discriminator 27 which opens one of the three valves 11a, 11b, 11c in dependence upon the pressure level. Two similar pressure sensors 28 for the upstream compartment 13 and 29 for the downstream compartment 14 have been illustrated in FIG. 1 for the tower 3a; it will be understood that the other towers are identically equipped.

The stem 16 of insert 7 carries a lug 30 coacting with two fixed stops 31, 32 limiting its vertical displacement (arrow A) to a range within which the pressure differential across the gap 15 varies linearly with the output of sensor 26. These ranges are different for the several nozzles 5 of towers 3a, 3b, 3c and are mutually complementary to provide an extended overall range of linearity. Thus, for example, the accelerator 5, 7 of tower 3a may function linearly in a range of relatively low pressure differentials, the discriminator 27 being designed to open the valve 11a to activate this tower when the input pressure in duct 8 exceeds the desired output pressure by a relatively small value. If the input pressure surpasses a certain threshold, discriminator 27 switches to valve 11a of tower 3a whose accelerator functions linearly in a range of higher pressure differentials; still higher input pressures cause a switchover to valve 11c for activation of the third tower 3c to the exclusion of the others.

Pressure sensor 28 works into respective inputs of two voltage comparators 33,34; an output lead of pressure sensor 29 is connected directly to an input of a third comparator 35 and through a biasing battery 36 to the second input of comparator 33. Comparators 34 and 35 have their second inputs maintained at a relatively high and a relatively low potential, respectively, by associated biasing batteries 37 and 38. A switch 39, controlled by the output of comparator 34, connects solenoid 17 of tower 3a to the output of either comparator 35 or comparator 33.

In the normal operation of the tower 3a, sensor 29 maintains a substantially constant output pressure at outlet 18 by applying to comparator 35 a voltage proportional to the pressure prevailing in downstream compartment 31. The difference between this voltage and the reference voltage from battery 38 gives rise to a proportional output signal of a corresponding polarity which, in the illustrated position of switch 39, energizes the solenoid 17 to an extent raising or lowering the pressure in compartment 14 until that voltage difference disappears. The magnitude of the stabilized pressure may, of course, be adjusted by modifying the reference voltage from source 38.

The operation just described can take place only as long as the upstream pressure in compartment 13 is high enough to maintain a sufficient pressure differential across partition 12, the magnitude of this upstream pressure being determined by sensor 28 which delivers a proportional signal voltage to comparator 34. As long as that signal voltage exceeds the preset (but preferably adjustable) reference voltage from battery 37, comparator 34 has an output maintaining switch 39 in its normal position. If, however, the pressure in compartment 13 does not surpass the threshold established by comparator 34, the latter has no output and switch 39 moves into its alternate position in which solenoid 17 is controlled by comparator 33 instead of comparator 35. The reference potential applied to comparator 33 is the output of sensor 29 augmented by the voltage of battery 36; thus, the output of comparator 33 is proportional and equal in sign to the difference between this augmented voltage and the output of sensor 28. Solenoid 17, in tending to establish an accelerator position making the two input voltages of comparator 33 equal to each other, thus maintains a pressure differential whose magnitude depends on the preferably adjustable biasing voltage of source 36.

Such a switchover may occur, for example, on start-up of the blast furnace 1 or upon reactivation of tower 3a after a prolonged cutoff under the control of programmer 26, 27. Until the pressure in the upstream compartment 13 builds up sufficiently for normal operation, the output pressure in outlet 18 will be lower than required for most efficient water separation. Instead of the automatic operation described, switch 39 could also be operated manually to change from constant output pressure to constant pressure differential or vice versa.

Figure 4:
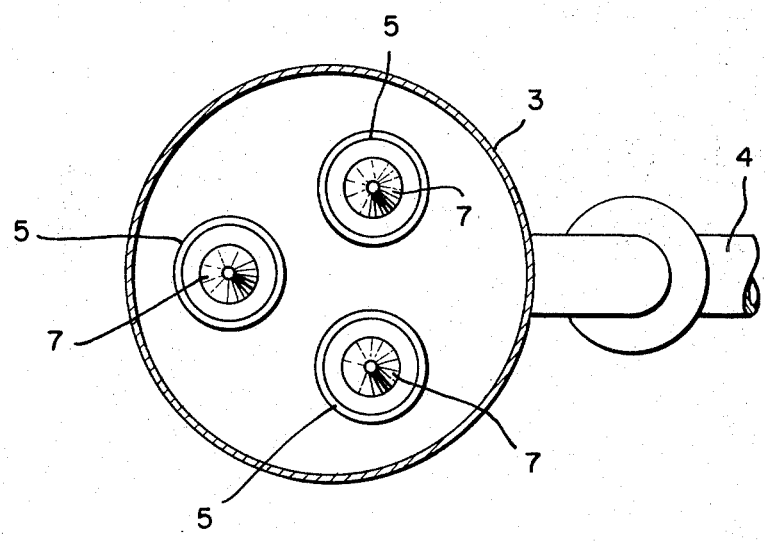
FIG. 4 is a cross-sectional view taken on the line IV — IV of FIG. 3.

As illustrated in FIGS. 3 and 4, the three nozzles 5 may be accommodated in a single tower 3 whose sprayers 6 are stacked along the axis of their triangular array. In this case, the tower has a conical partition 12' with a downwardly pointing apex, at least the major part of outlet 18 lying above the level of that apex. Water accumulating on the partition, as well as on an underlying trough 40 in which the stems 16 of inserts 7 are guided, may be let off by nonillustrated drain pipes connected to the apex of the partition and of the trough.

Similar drain pipes should, of course, be provided at the low points of partitions 12 in FIG. 1.

The solenoids controlling the stems 16 of accelerating inserts 7 are disposed in housings 41 at the bottom of tower 3. In the absence of individual inlets to these nozzles, as shown in the previous embodiment, pressure sensor 26 selectively deactivates the individual nozzles 5 by de-energizing their solenoids so as to withdraw the inserts 7 into a position plugging their constricted waists. The operation is otherwise analogous to that described above, except that pressure sensors 28, 29 and comparators 33 - 35 are common to all three solenoids to control their energization unless overriden by the sensor 26.

We claim:

1. An apparatus for cleaning high-pressure waste gases, comprising:
   at least one wash tower with inlet means for waste gases and outlet means for washed gas;
   partition means in said tower dividing same into an upstream compartment communicating with said inlet means and a downstream compartment communicating with said outlet means;
   spray means in said upstream compartment for wetting the incoming waste gases;
   flow-accelerating means in said partition means forming at least one throttled passage for the wetted gases to said downstream compartment;
   setting means coupled with said flow-accelerating means for varying the effective width of said passage; and
   pressure-sensing means in communication with the interior of said tower controlling said setting means for maintaining a substantially constant output pressure at said outlet means.

2. An apparatus as defined in claim 1, further comprising a dustbin inserted in the path of said inlet means.

3. An apparatus as defined in claim 1, further comprising switch means controlled by said pressure-sensing means for modifying the operation of said setting means in the presence of an abnormally low input pressure at said inlet means to maintain a substantially constant pressure differential across said passage.

4. An apparatus as defined in claim 1 wherein said flow-accelerating means comprises a plurality of flow accelerators disposed in parallel between said inlet means and said outlet means, said accelerators having different pressure characteristics with mutually complementary ranges of substantially linear response to said pressure-sensing means.

5. An apparatus as defined in claim 4 wherein said accelerators are arranged in said tower about a central vertical axis, said spray means composing a plurality of spray heads stacked along said axis.

6. An apparatus as defined in claim 4, further comprising switching means controlled by said pressure-sensing means in response to the waste-gas pressure for selectively activating only that accelerator whose linear range encompasses the momentary input pressure at said inlet means.

7. An apparatus as defined in claim 1 wherein said flow-accelerating means comprises a vertical nozzle traversing said partition means and a central body positioned with annular clearance in a constricted portion of said nozzle, said body being vertically movable with reference to said nozzle under the control of said setting means.

8. An apparatus as defined in claim 7 wherein said upstream compartment is located above said partition means, said constricted portion being disposed below the level of said partition means.

9. An apparatus as defined in claim 8 wherein said outlet is disposed laterally on said tower below said partition means but above the level of the lower end of said nozzle.

10. An apparatus as defined in claim 9, further comprising a water separator adjacent said tower in the form of a vertical cylinder with a centrally disposed downwardly open entrance port connected to said outlet means, a centrally disposed upwardly open exit port beneath said entrance port and a central deflector between said ports.

* * * * *